United States Patent [19]

Holloway

[11] Patent Number: 5,125,843
[45] Date of Patent: Jun. 30, 1992

[54] CONTROL DEVICE

[75] Inventor: Wynford P. Holloway, Heath, United Kingdom

[73] Assignee: Konix Products Limited, Cardiff, United Kingdom

[21] Appl. No.: 646,713
[22] PCT Filed: May 30, 1989
[86] PCT No.: PCT/GB89/00589
  § 371 Date: Jan. 28, 1991
  § 102(e) Date: Jan. 28, 1991
[87] PCT Pub. No.: WO89/11704
  PCT Pub. Date: Nov. 30, 1989

[30] Foreign Application Priority Data

May 27, 1988 [GB] United Kingdom ............... 8812716

[51] Int. Cl.⁵ .................................................. G09B 9/08
[52] U.S. Cl. ........................................... 434/45; 434/61
[58] Field of Search ................... 434/45, 61; 272/73, 272/1 C; 273/DIG. 28, 148 R, 148 B

[56] References Cited

U.S. PATENT DOCUMENTS

| | | | |
|---|---|---|---|
| 4,265,047 | 5/1981 | Meyer et al. | 46/232 |
| 4,512,567 | 4/1985 | Phillips | 272/73 |
| 4,542,897 | 9/1985 | Melton et al. | 272/73 |
| 4,659,313 | 4/1987 | Kuster et al. | 434/45 |
| 4,709,917 | 12/1987 | Yang | 434/61 |
| 4,978,300 | 12/1990 | Letovsky et al. | 434/61 |

Primary Examiner—Richard J. Apley
Assistant Examiner—Glenn E. Richman
Attorney, Agent, or Firm—Edwin D. Schindler

[57] ABSTRACT

The control device, which provides control signals to a computer simulating a vehicle being driven, includes a handle 10 which is manually rotatable about a first axis 11, the handle comprising a handlebar 16 extending outwards from the first axis on either side thereof. The handlebar includes an inner portion 17 and hand grips 18 on the ends thereof inner portion, the hand grips being slightly curved and obliquely pivoted to the respective inner portion of the handlebar in such a way that in a first disposition the hand grip is substantially aligned with the inner portion to simulate handlebars of a motor cycle, and in a second disposition the hand grips are in a position simulating a joystick of an aircraft, wherein the inner portions represent spokes and the hand grips are generally parallel to one another. Conveniently, the control device also includes a hand wheel to simulate a steering wheel of a car or the like, the hand wheel being adapted to attach onto the hand grips when the latter are in the aircraft joystick simulating position.

10 Claims, 3 Drawing Sheets

CONTROL DEVICE

This invention relates to a control device for computers or other data processing apparatus and is applicable particularly, but not exclusively, to a control device for providing control signals to a computer simulating a vehicle being driven.

According to the present invention, there is provided a control device for data processing apparatus, said device including a handlebar comprising a first handlebar shaft extending outwardly from one side of a column and a second handlebar shaft extending outwardly from a second side of said column, said handlebar being rotatably mounted to said column for rotation about a first axis such that manual rotation of said handlebar about said axis produces a first electrical control signal for transmission to said data processing apparatus, said column being further manually rotatable about a second axis which is inclined to said first axis and displaced therefrom, and arranged such that rotation of said column abut said second axis produces a second electrical control signal for transmission to the data processing apparatus, each of said handlebar shafts having, at the respective end thereof, a hand grip portion obliquely pivoted to the respective handlebar shaft in such a way that in a first disposition said hand grip is substantially aligned with the respective handlebar shaft and in a second disposition said hand grip extends away from said second axis.

Each hand grip is obliquely pivoted to the respective handlebar shaft typically in such a way that in the first disposition the hand grip is substantially aligned with the shaft so as to simulate handlebars of a motor cycle, and in the second disposition the hand grip extends away from the second axis or is generally tangential to the first axis, so as to simulate a joystick of an aircraft, wherein the shafts represent spokes and the outer handgrips are generally parallel to one another.

Preferably, the control device includes a hand wheel to simulate a steering wheel of a car or the like, the hand wheel being adapted to attach onto the hand grips when the latter are in the second disposition (that is, simulating an aircraft joystick).

Preferably the first and second control signals are produced by first and second potentiometers controlled by movement of the handlebar and the column about the first and second axis respectively. The potentiometers may be rotary types each mounted co-axially with the respective first and second axis.

Conveniently the control device is adapted to be operated by an operator, with the first axis aligned in a direction generally towards and away from the operator and with the second axis below the first axis and transverse to the operator and in front of him.

Preferably the first and second handlebar shafts (which may be integral such that one is a continuation of the other) lie in or close to a plane displaced from and below the first axis, the hand grips being provided on the ends of the respectively shafts, the longitudinal axis of the hand grips intersecting on or near the first axis. The hand grips may be slightly curved.

Preferably, the control device includes a base to which the lower end of the column is rotatably mounted for rotation about the second axis, the handlebar being mounted on the upper end of the column for rotation about the first axis.

The column may be lockable to the base, so that the first axis can be set near vertical to simulate the steering head angle of a motorcycle, or near horizontal to simulate the steering column angle of a car or the like, and the column may be allowed limited angular rotational movement about the second axis to simulate fore-and-aft movement of an aircraft joystick.

The control device according to the invention may also include a further manually operable lever, movable to produce another electrical signal to the data processing apparatus, to simulate a throttle or power control of an aircraft. The control device may further include foot-operable control means operable to produce a further electrical signal to the data processing apparatus.

Various embodiments of the invention will now be described, by way of example only, with reference to the accompanying drawings, in which.

Figure 2:
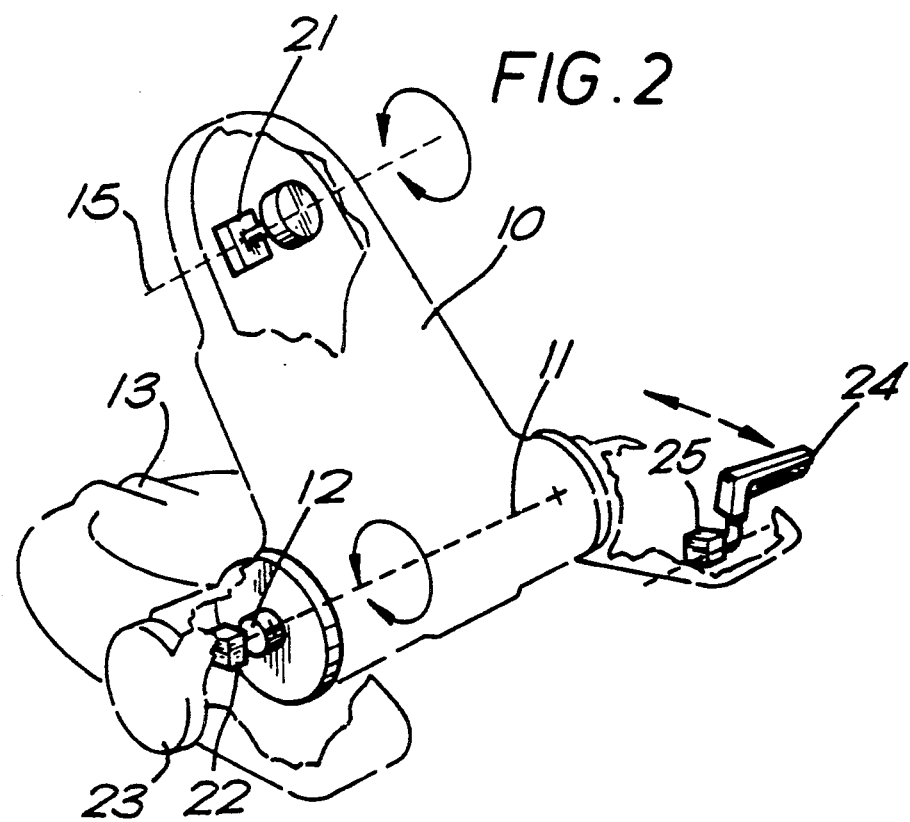
FIG. 2 is similar to FIG. 1, with various parts omitted or broken away to reveal the interior construction thereof.

In the drawings, a hollow plastics column 10 is rotatably mounted at the bottom thereof about a transverse axis 11 (shown in FIG. 2) on spigots 12 to the side arms of a generally U-shaped base 13. A hub member 14 is rotatably mounted to the upper end of the column 10 about an axis 15 (shown in FIG. 2) normal to the axis 11 and normal to the long axis of the column 10.

Figure 1:
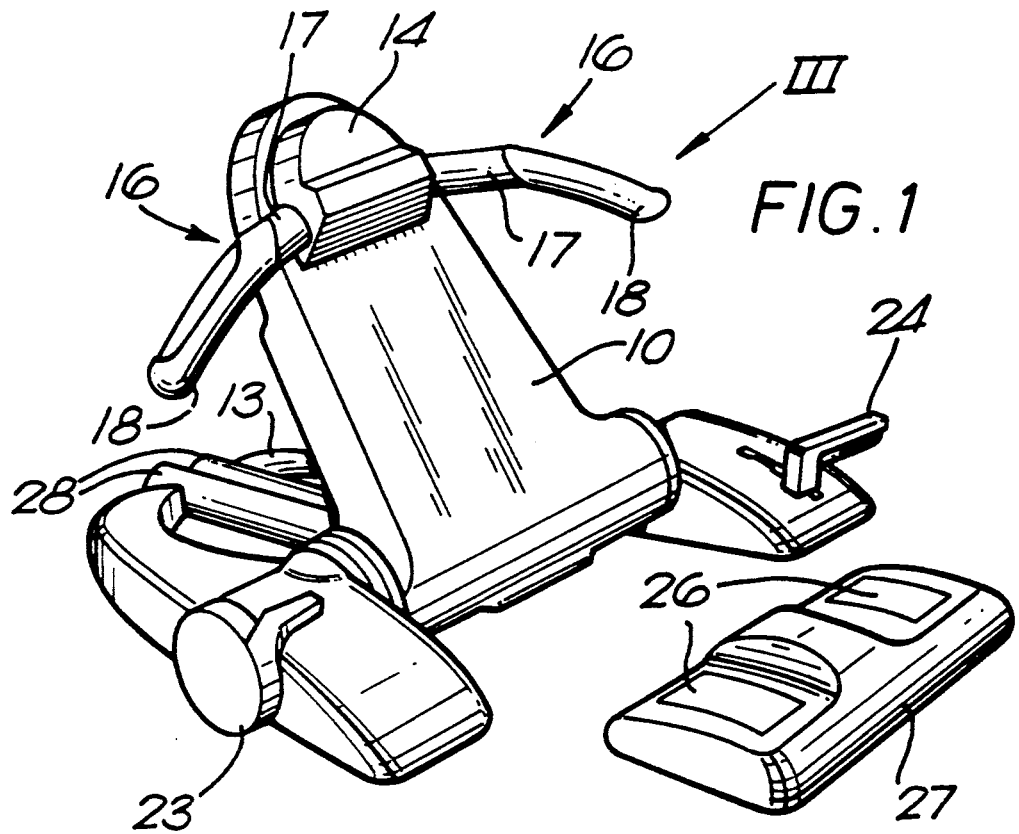
FIG. 1 is a perspective view of a control device according to the invention.
Figure 3:
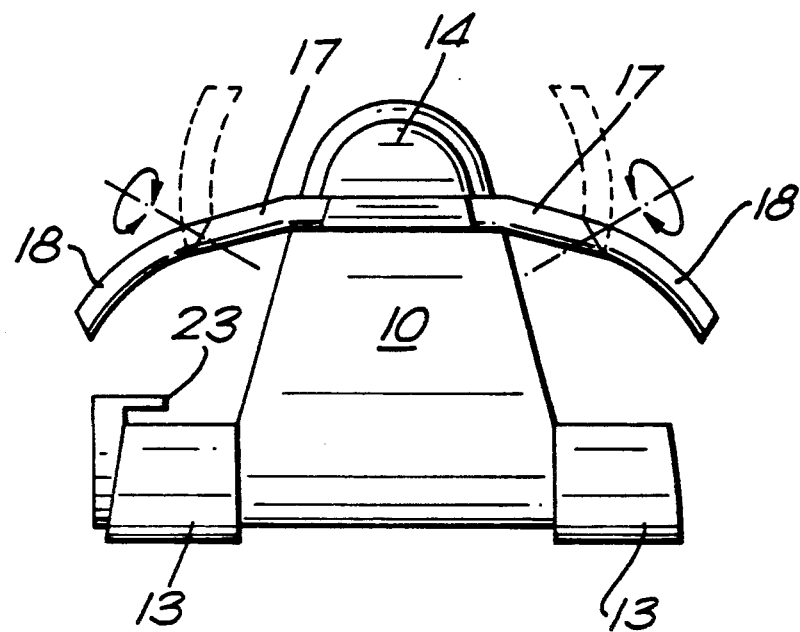
FIG. 3 is a view in the direction of the arrow III in FIG. 1.
Figure 4:
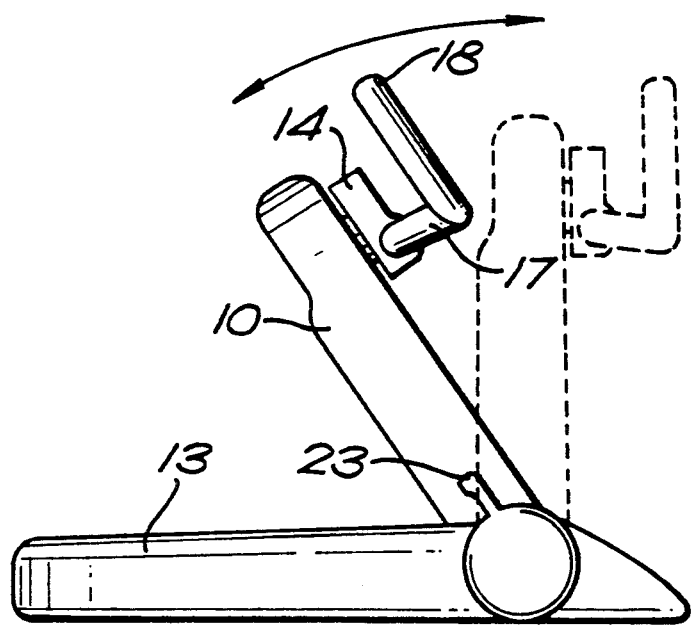
FIG. 4 is a side view of the control device shown in FIG. 1, simulating an aircraft joystick control.
Figure 5:
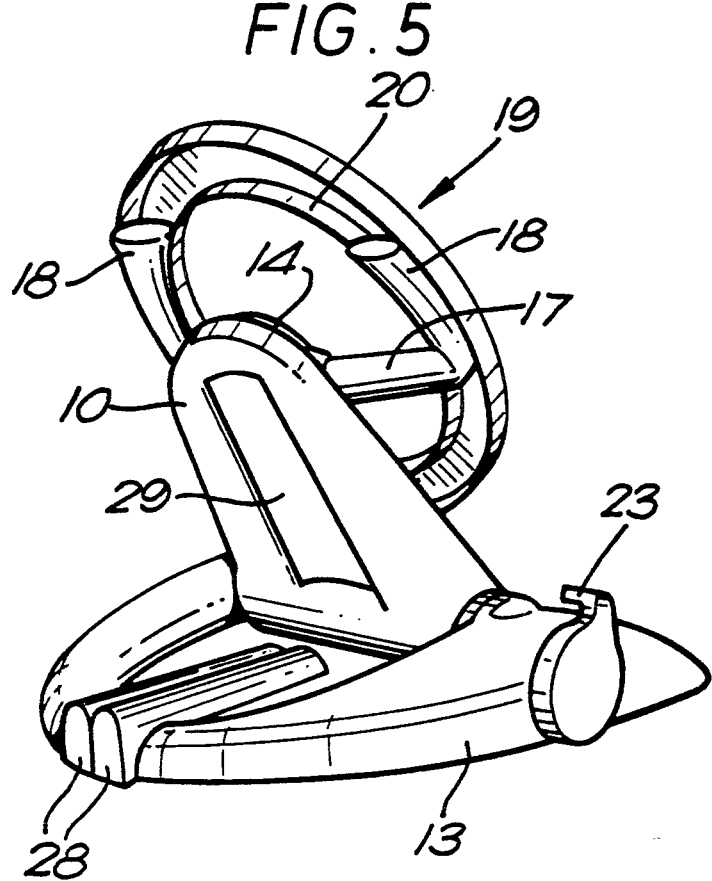
FIG. 5 is a rear perspective view of the control device shown in FIG. 1, simulating a motor vehicle steering control.
Figure 6:
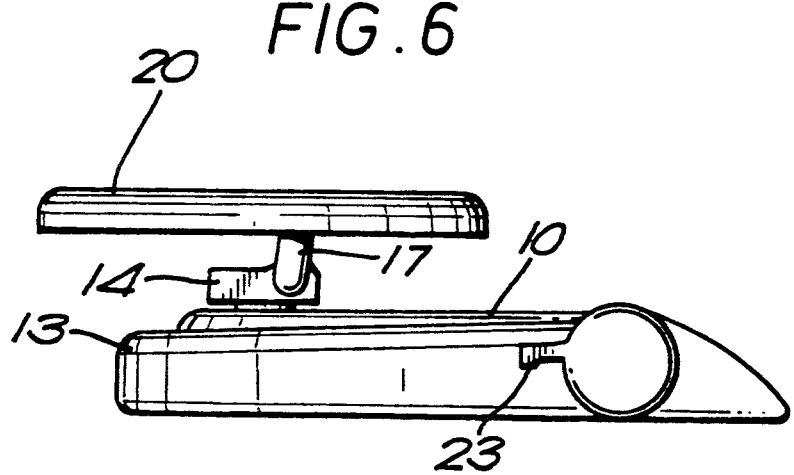
FIG. 6 is a side view of the control device shown in FIG. 5, in a stowing position.

A handlebar 16 protrudes laterally and symmetrically from either side of the hub member 14, to which the handlebar is rotatably mounted. Each side of the handlebar comprises inner portions 17 and hand grips 18. Thus, the inner portions 17 and hand grips 18 can be generally aligned, to simulate the handlebars of a motor cycle, as shown in FIGS. 1 and 3. The hand grips 18 can be rotated until they reach, and stay at, positions in which they are tangential to the axis 15, as shown in FIGS. 3, 4 and 5. The handlebar 16 then simulates a joystick of an aircraft, and for greater realism the hand grips 18 may be arcuate about the axis 15.

In order to simulate the steering wheel 19 of a motor car, truck, boat or the like, as shown in FIG. 5, a loose wheel rim 20 of U-shaped cross-section may be clipped onto the hand grips 18, when in the aircraft joystick disposition, being enabled by the arcuate shape of the hand grips 18.

Rotation of the hub member 14 about the axis 15 produces electrical signals, to be fed to a data processing apparatus, by means of a transducer 21, which may be a potentiometer of the resistive, inductive or capacitive type. Similarly, rotation of the column 10 on the base 13, about the axis 11, produces electrical signals, to be fed to the data processing apparatus, by means of a similar transducer 22.

A locking or clamping lever 23 enables the column 10 to be fixed at a high position, when simulating a steering wheel, as in FIG. 5, or at a lower position, with the axis 15 nearer the vertical, when simulating a motorcycle.

When used to simulate an aircraft joystick, the column is allowed limited fore-and-aft travel near the upright position, between the dotted and solid line positions shown in FIG. 4.

A simulated throttle or other power-controlled lever 24 is provided at one side of the base 13. The lever 24 operates a transducer 25 to produce electrical signals to be fed to the data processing apparatus.

Two other control signals may be provided for the data processing apparatus by foot-operated pads or pedals 26 in a housing 27 which may be placed on the floor. The pads 26 operate suitable transducers within the housing 27.

The base 13 is formed with strengthening ribs 28 which can enter a hollow 29 in the back of the column 10, when the column 10 is folded down to the base 13 for stowing away.

In some embodiments of the invention, the handlebar may be provided with biassing means for biassing the handlebar to a central position.

The electrical signals fed to the data processing apparatus may be processed thereby to control a display on a video display unit (VDU) screen. The system may be used for various games, tests of skill or for training purposes.

In some embodiments of the invention, the data processing apparatus may comprise a microprocessor and associated circuitry provided within the control device itself.

I claim:

1. A control device for data processing apparatus, said device including a handlebar comprising a first handlebar shaft extending outwardly from one side of a column and a second handlebar shaft extending outwardly from a second side of said column, said handlebar being rotatably mounted to said column for rotation about a first axis such that manual rotation of said handlebar about said axis produces a first electrical control signal for transmission to said data processing apparatus, said column being further manually rotatable about a second axis which is inclined to said first axis and displaced therefrom, and arranged such that rotation of said column about said second axis produces a second electrical control signal for transmission to the data processing apparatus, each of said handlebar shafts having, at the respectively end thereof, a hand grip portion obliquely pivoted to the respective handlebar shaft in such a way that in a first disposition said hand grip is substantially aligned with the respective handlebar shaft and in a second disposition said hand grip extends away from said second axis.

2. A control device according to claim 1, which further comprises a hand operable wheel adapted for attachment to said hand grips when the latter are in the respective second dispositions.

3. A control device according to claim 1, wherein said first and second control signals are produced by first and second potentiometers controlled by respective movement of said handlebar and said column about said first and second axis.

4. A control device according to claim 2, in which said potentiometers are of rotary type and are mounted coaxially with the respective first and second axis.

5. A control device according to claim 1, which includes a base to which the lower end of said column is rotatably mounted, the handlebar being rotatably mounted on the upper end of said column.

6. A control device according to claim 5, which is further provided with means for locking said column to said base such that the first axis can be set approximately vertically and/or approximately horizontally.

7. A control device according to claim 6, wherein said column is capable of fore-and-aft movement about said second axis when said locking means is disengaged.

8. A control device according to claim 1, which is arranged to be operated by an operator, with the first axis aligned in a direction generally towards and away from the operator and with the second axis below the first axis and transverse to the operator and in front of him.

9. A control device according to claim 1, which further comprises a manually operable lever and/or foot-operable control means, said lever and said control means being each operable to produce a respective further electrical signal to the data processing apparatus.

10. A control device according to claim 1, wherein said data processing apparatus comprises a microprocessor and associated circuitry provided within the control device itself.

* * * * *